United States Patent
Jang (10) Patent No.: US 12,026,493 B2
(45) Date of Patent: Jul. 2, 2024

(54) DOCKER IMAGE CREATION APPARATUS AND METHOD

(71) Applicant: ELECTRONICS AND TELECOMMUNICATIONS RESEARCH INSTITUTE, Daejeon (KR)

(72) Inventor: Su-Min Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 58 days.

(21) Appl. No.: 17/836,039

(22) Filed: Jun. 9, 2022

(65) Prior Publication Data

US 2023/0091587 A1    Mar. 23, 2023

(30) Foreign Application Priority Data

Sep. 17, 2021    (KR) .................... 10-2021-0124885

(51) Int. Cl.
*G06F 8/61* (2018.01)

(52) U.S. Cl.
CPC ...................................... *G06F 8/63* (2013.01)

(58) Field of Classification Search
CPC ........................................................ G06F 8/63
See application file for complete search history.

(56) References Cited

U.S. PATENT DOCUMENTS

| | | | |
|---|---|---|---|
| 9,075,693 B2 | 7/2015 | Sporkert et al. | |
| 10,496,987 B2* | 12/2019 | Zhang | G06F 9/5077 |
| 10,812,582 B2* | 10/2020 | Spillane | G06F 16/178 |
| 11,068,245 B2* | 7/2021 | Jaeger | G06F 8/4441 |
| 11,157,257 B2* | 10/2021 | Azulai | G06F 8/65 |
| 2017/0344289 A1 | 11/2017 | Jeong | |
| 2018/0095973 A1* | 4/2018 | Huang | G06F 16/1748 |
| 2018/0373517 A1* | 12/2018 | Hu | H04L 67/34 |
| 2019/0347127 A1* | 11/2019 | Coady | G06F 8/63 |

(Continued)

FOREIGN PATENT DOCUMENTS

| | | | | |
|---|---|---|---|---|
| CN | 107491329 A | * | 12/2017 | ............... G06F 8/63 |
| CN | 108390920 A | * | 8/2018 | |

(Continued)

OTHER PUBLICATIONS

Truyen et al., "A Comprehensive Feature Comparison Study of Open-Source Container Orchestration Frameworks", 2019, www.mdpi.com/journal/applsci (Year: 2019).*

(Continued)

*Primary Examiner* — Wei Y Zhen
*Assistant Examiner* — Junchun Wu
(74) *Attorney, Agent, or Firm* — LRK PATENT LAW FIRM (57) ABSTRACT

Disclosed herein are a Docker image creation apparatus and method. The Docker image creation apparatus may include one or more processors, and execution memory for storing at least one program that is executed by the one or more processors, wherein the at least one program is configured to create a Docker image based on a previous Docker file, and executing a push command to store the created the Docker file to a registry, wherein the Docker file is created from a partial Docker file of the previous Docker file, wherein the Docker image is created from a verified partial Docker file, after the partial Docker file is verified.

8 Claims, 10 Drawing Sheets

(56) References Cited

U.S. PATENT DOCUMENTS

| | | | |
|---|---|---|---|
| 2020/0167267 A1* | 5/2020 | Liu | G06F 11/3684 |
| 2020/0285733 A1 | 9/2020 | Kim et al. | |
| 2020/0293354 A1 | 9/2020 | Song et al. | |
| 2020/0412769 A1 | 12/2020 | Yi et al. | |
| 2021/0011885 A1* | 1/2021 | Liu | G06F 8/63 |
| 2021/0208862 A1* | 7/2021 | Azulai | G06F 8/65 |
| 2021/0311758 A1* | 10/2021 | Cao | G06F 8/70 |
| 2023/0037382 A1* | 2/2023 | Song | G06F 8/70 |
| 2023/0091587 A1* | 3/2023 | Jang | G06F 8/63 717/177 |
| 2023/0195435 A1* | 6/2023 | Jaeger | G06F 8/4441 717/143 |

FOREIGN PATENT DOCUMENTS

| | | | | |
|---|---|---|---|---|
| CN | 108415795 A | * | 8/2018 | ......... G06F 11/1438 |
| CN | 108897527 A | * | 11/2018 | ............... G06F 8/20 |
| CN | 110704156 A | * | 1/2020 | ............... G06F 8/63 |
| CN | 113296888 A | * | 8/2021 | ........... G06F 16/148 |
| CN | 108369622 B | * | 11/2021 | ............. G06F 21/44 |
| KR | 10-2014-0001172 A | | 1/2014 | |
| KR | 10-2017-0133120 A | | 12/2017 | |
| KR | 10-2019-0076212 A | | 7/2019 | |
| KR | 10-2092458 B1 | | 3/2020 | |

OTHER PUBLICATIONS

Kozhirbayev et al., "A performance comparison of container-based technologies for the Cloud", 2016, ELSEVIER (Year: 2016).*

Nathan et al., "CoMICon: A Co-operative Management System for Docker Container Images", 2017, IEEE (Year: 2017).*

Zhao et al., "Large-Scale Analysis of Docker Images and Performance Implications for Container Storage Systems", Apr. 2021, vol. 32, No. 4 (Year: 2021).*

* cited by examiner

DOCKER IMAGE CREATION APPARATUS AND METHOD

CROSS REFERENCE TO RELATED APPLICATION

This application claims the benefit of Korean Patent Application No. 10-2021-0124885, filed Sep. 17, 2021, which is hereby incorporated by reference in its entirety into this application.

BACKGROUND OF THE INVENTION

1. Technical Field

The present invention relates generally to container platform technology, and more particularly to technology for creating, distributing, and managing a Docker image.

2. Description of Related Art

Recently, Information Technology (IT) service applications are configured to very conveniently perform the distribution and management of programs in such a way as to abstract various programs and runtime environments into a container using Docker images and provide a consistent interface. In this way, any type of program, such as various back-end programs, database (DB) servers, and message queues, may be abstracted into containers through Docker images, and may be executed anywhere, such as a normal Personal Computer (PC) or a public cloud. In Google, which is an enterprise in which containers are widely used, all services are operated in containers, and several billions of containers are running every week.

However, during the process of operating and managing container platforms, the procedure for creating and registering Docker images matching various runtime environments requires a repetitive task of adding respective packages required in order for an application developer to create application images. A problem arises in that this repetitive task is very inefficient and incurs high management costs.

Meanwhile, Korean Patent No. 10-2092458, entitled "Method and System for Supporting Virtualized GPU Resource in Serverless Computing Environment" discloses a method and system for generating an Application Programming Interface (API) which enables a client to generate an API for remotely transmitting a Docker image, runs the Docker image created in response to a Docker image creation request, implements an API and a command required in order to process requests from a server, and allows the client to issue a command for calling the API.

SUMMARY OF THE INVENTION

Accordingly, the present invention has been made keeping in mind the above problems occurring in the prior art, and an object of the present invention is to enable an application to be executed through a single task without requiring a separate additional task even if movement to a different computing environment occurs through a container service.

Another object of the present invention is to reduce management costs incurred during the process of operating and managing a container platform.

In accordance with an aspect of the present invention to accomplish the above objects, there is provided a Docker image creation apparatus, including one or more processors; and an execution memory for storing at least one program that is executed by the one or more processors, wherein the at least one program is configured create a Docker image based on a previous Docker file, and execute a push command to store the created the Docker file to a registry, wherein the Docker file is created from a partial Docker file of the previous Docker file, wherein the Docker image is created from a verified partial Docker file, after the partial Docker file is verified.

The at least one program may be configured to combine a predefined requirement package list, a runtime environment list, and an initial partial Docker file and then generate the partial Docker file; and delete overlapping requirement packages by comparing requirement packages included in the requirement package list with each other so as to process the mutual dependency.

The at least one program may be configured to delete overlapping requirement packages by comparing the requirement packages in the requirement package list with requirement packages in a new requirement package list with each other so as to process the mutual dependency.

The at least one program may be configured to analyze whether the Docker image is operated by running the Docker image in a container.

The at least one program may be configured to divide the Docker image into respective layers and store pieces of detailed information for respective layers.

In accordance with another aspect of the present invention to accomplish the above objects, there is provided a Docker image creation method performed by a Docker image creation apparatus, the Docker image creation method including creating, by one or more processors, a Docker image based on a previous Docker file and executing, by one or more processors, a push command to store the created Docker file to a registry, wherein the Docker file is created from a partial Docker file of the previous Docker file, wherein the Docker image is created from a verified partial Docker file, after the partial Docker file is verified.

Generating the partial Docker file may include combining a predefined requirement package list, a runtime environment list, and an initial partial Docker file and then generate the partial Docker file; and deleting overlapping requirement packages by comparing requirement packages included in the requirement package list with each other so as to process the mutual dependency.

Generating the partial Docker file may further include deleting overlapping requirement packages by the comparing requirement packages in the requirement package list with requirement packages in a new requirement package list with each other so as to process the mutual dependency.

Creating the Docker image may include analyzing whether the Docker image is operated by running the Docker image in a container.

Creating the Docker image may further include dividing the Docker image into respective layers and storing pieces of detailed information for respective layers.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 1:
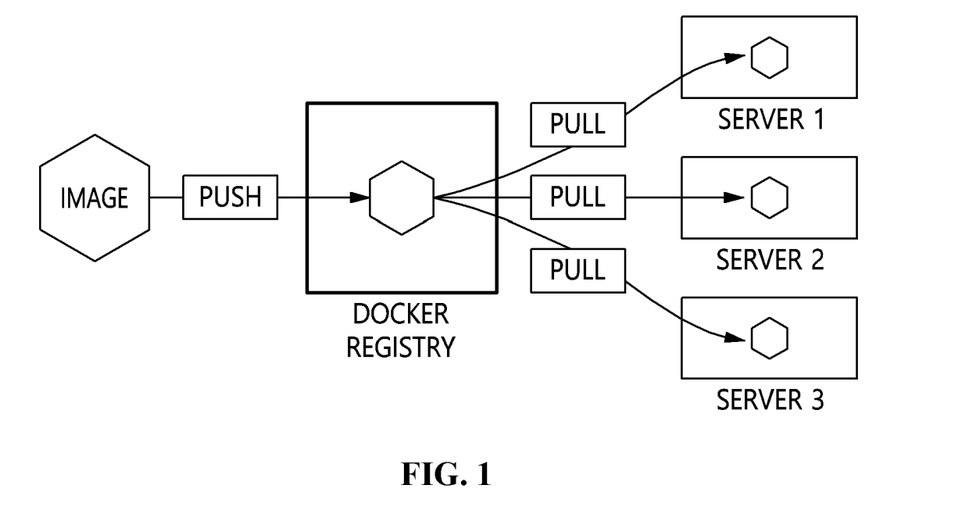
FIG. 1 is a diagram illustrating a Docker image distribution environment according to an embodiment of the present invention.

FIG. 1 is a diagram illustrating a Docker image distribution environment according to an embodiment of the present invention.

Referring to FIG. 1, it can be seen that a Docker image distribution environment for creating a Docker image according to an embodiment of the present invention is illustrated. Docker may provide the distribution and management of Docker images in various environments based on both a push command, which registers a built image using a Docker registry without directly copying a file so as to distribute the built image to a server, and a pull command, which is exploited when using the built mage.

The present invention may provide an apparatus and a method for creating a great variety of smart Docker images by defining and storing Docker files, previously used to create images to be run by an application, as partial Docker files and by combining only required portions of the partial Docker files.

Figure 2:
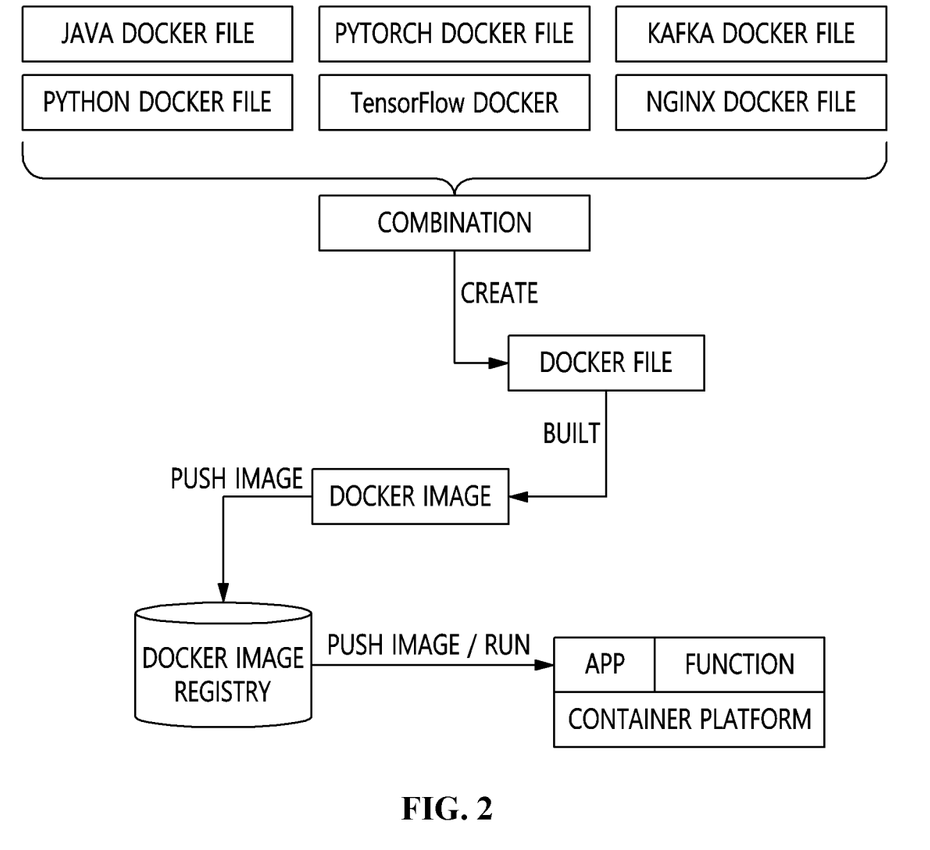
FIG. 2 is a diagram illustrating a Docker image creation process using a partial Docker file according to an embodiment of the present invention.

FIG. 2 is a diagram illustrating a Docker image creation process using a partial Docker file according to an embodiment of the present invention.

Referring to FIG. 2, it can be seen that a smart Docker image creation process using a partial Docker file is illustrated.

Generally, an application service developer may individually create and use various Docker files, such as Java, PyTorch, Kafka, Python, and TensorFlow, whenever the corresponding Docker file is needed in order to create application containers. For example, when the application developer creates a desired container so that Java is executed in the container and a Kafka server is operated in the container, a Docker file must be newly created by setting up respective packages related to Java and Kafka in a desired version. However, as illustrated in FIG. 2, the present invention may create a desired Docker file by combining required portions among the previously created Docker files, rather than creating Docker files from scratch. By means of this method, there can be solved a very serious problem in that applications requiring various runtime environments cannot be executed by providing only several images that are selected in advance, rather than providing a wide variety of images.

Figure 3:
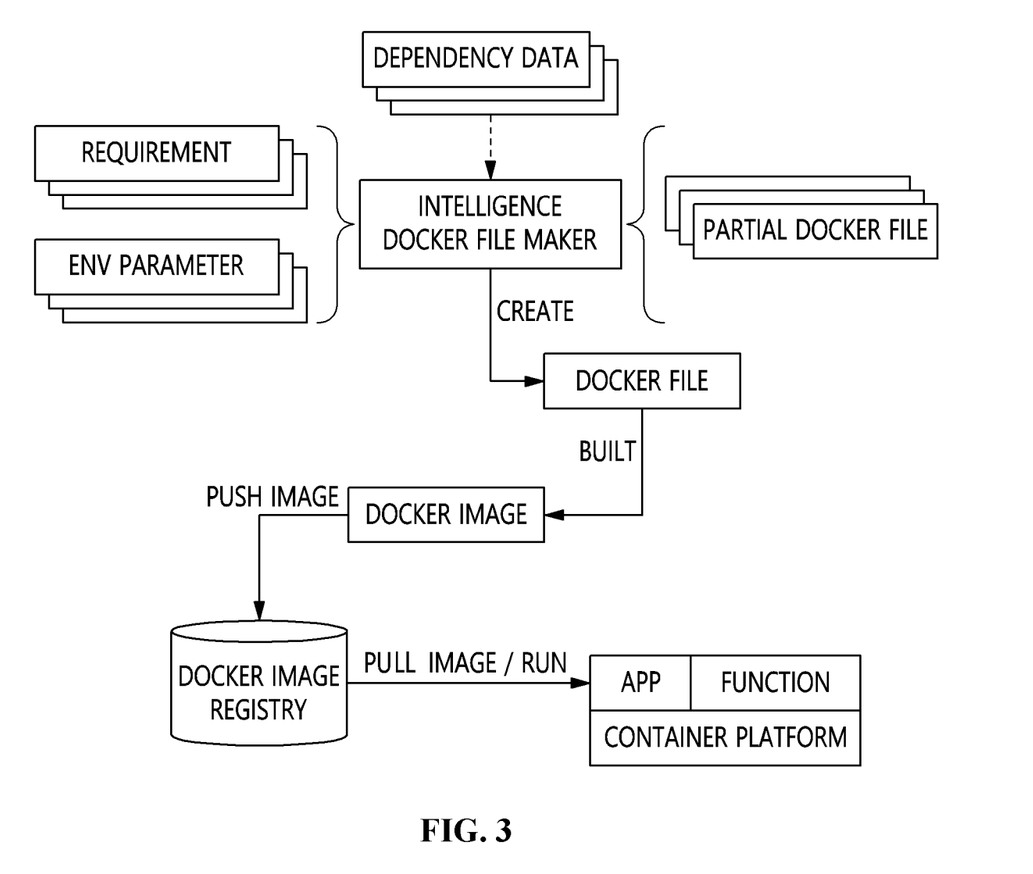
FIG. 3 is a diagram illustrating components for creating a Docker image through partial modularization according to an embodiment of the present invention.

FIG. 3 is a diagram illustrating components for creating a Docker image through partial modularization according to an embodiment of the present invention.

Referring to FIG. 3, the components required to in order implement a Docker image creation apparatus and method according to an embodiment of the present invention are illustrated. The principal components illustrated in FIG. 3 include requirement packages (hereinafter also referred to "requirements") needed in order to execute an application service, Env parameters corresponding to runtime environment parameters, and partial Docker files (Dockerfiles) functioning as base images used to create a previous Docker file. Additionally, dependency data may include information on dependencies between the requirements in the process of installing various requirements. Finally, an intelligent Docker file maker located at the center of the drawing may finally create a Docker file by combining the requirements, the runtime environment parameters (Env parameters), and the partial Docker files with reference to the dependency data. After the Docker file has been created, a Docker image may be built and stored in a Docker image registry through a push command, and the Docker image may be run in the Docker image registry through a pull command.

Figure 4:
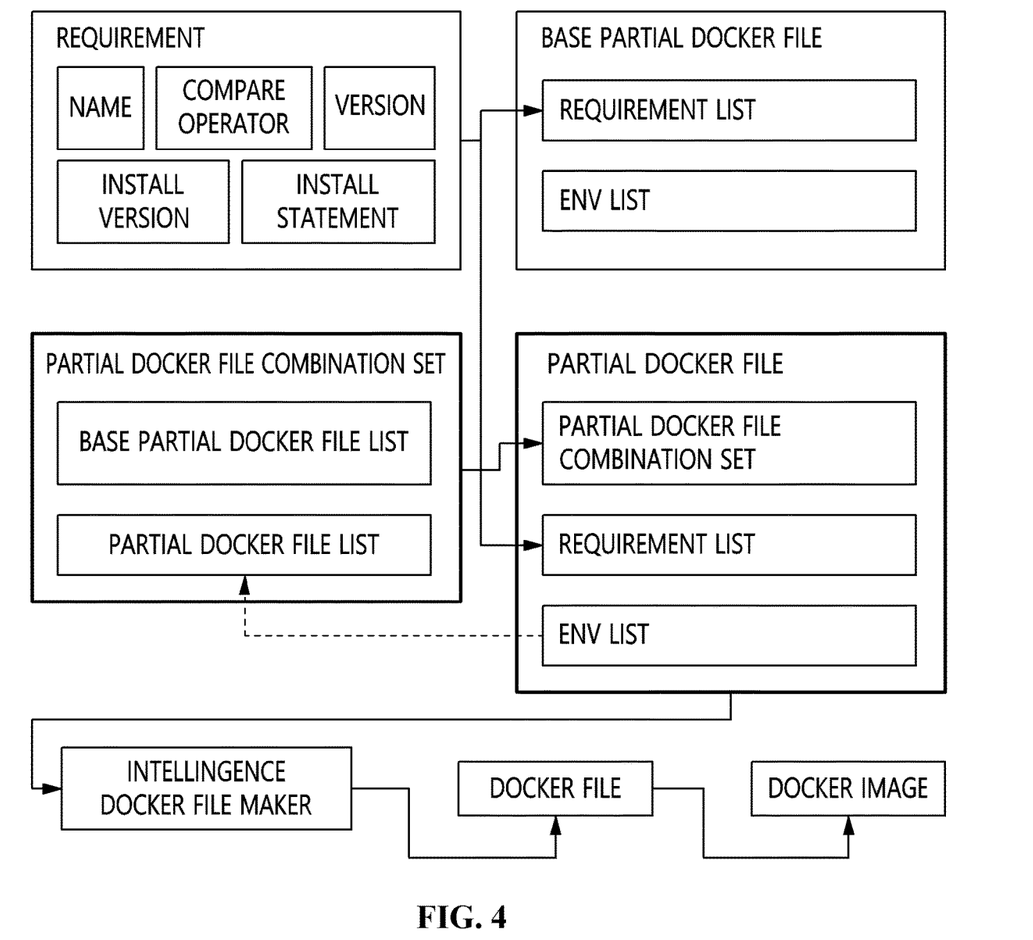
FIG. 4 is a diagram illustrating the configuration of a partial Docker file according to an embodiment of the present invention.

FIG. 4 is a diagram illustrating the configuration of a partial Docker file according to an embodiment of the present invention.

Referring to FIG. 4, it can be seen that a partial Docker file, which is a new Docker file, is created by combining portions of previously used base Docker files.

The partial Docker file may be composed of a partial Docker file combination set, a requirement package (requirement) list, and a runtime environment (Env) list.

The partial Docker file combination set may include a combination of a base partial Docker file list, in which a base partial Docker file is not defined or in which one or more base partial Docker files can be included, and a partial Docker file list, in which a partial Docker file is not defined or in which one or more partial Docker files can be included.

In this case, the base partial Docker file may include a requirement list and a runtime environment (Env) list.

Here, the partial Docker file may include a requirement list and a runtime environment (Env) list, and may further include a partial Docker file combination set.

The base partial Docker file may correspond to a partial Docker file composed of only the requirement list and the runtime environment list, without being combined with a previous partial Docker file.

However, the partial Docker file may not include a partial Docker file combination set.

That is, the case in which the partial Docker file combination set is not included may correspond to a base partial Docker file, and the base partial Docker file may correspond to a partial Docker file.

Also, it can be seen that the requirements required for execution of an application include elements such as a name, a comparison operator, a version, an install version, and an install statement.

The element "comparison operator" is a comparison operator indicating whether the version of the requirement package (requirement) to be installed is equal to or higher than a specific version, or lower than the specific version.

The element "install version" and "install statement" may include the version and statement of the actually installed package.

An intelligent Docker file maker may compare mutual dependencies between requirement packages (requirements) included in the partial Docker file combination set of the partial Docker file with each other, remove overlapping requirements, and then create an optimized Docker file.

Finally, it can be seen that the intelligent Docker file maker may convert the partial Docker file into a Docker file.

That is, a single partial Docker file may also be converted into a complete Docker file by which an image can be created.

[Pseudo-Code 1]
name: test
os:
type: ubuntu
version: 18.04
version: 1.0
partial docker:
base_http_server==1.0
base_python==2.7
requirement:
nginx>=1.18:
  nginx=1.19.2:
    apt-get update
    apt-get install -y gcc g++ libpere3 libpere3-dev
      libssl-dev
javajdk==8:
javajdk=8: apt-get install -y openjdk-8-j dk-headless
env:
WORKDIR/etc/nginx The above-described Pseudo-code 1 may define the partial Docker file in yet another markup language (yaml) format. Elements constituting the partial Docker file yaml may include a name, an operating system (OS), the type of OS, the version of the OS, a version, a partial Docker, requirements, and Evn.

The element 'name' may indicate the name of a partial Docker.

The element 'OS' may indicate a portion in which an operating system (OS) on which the partial Docker is used is defined.

The element 'type of OS' may indicate an OS platform.

The element 'version of OS' may indicate the version of the operating system (OS).

The element 'version' may indicate the version of the partial Docker.

The element 'partial docker' may indicate the partial Docker version (list) to be referenced.

The element 'requirement' may indicate an essential element and an installation method thereof when the corresponding partial Docker is used.

The element 'Evn' may indicate a runtime environment setup (list).

Referring to Pseudo-code 1, base_http_server==1.0 and base_python==2.7 of the partial Docker may mean that version 1.0 of the partial Docker file named 'base_http_server' and version 2.7 of the partial Docker file named 'base_python' are combined with each other. In the case of the requirement package (requirement), "nginx>=1.18" means that the version thereof needs to be equal to or greater than 1.18. The case where nginx of the partial Docker file currently being created satisfies "nginx>=1.18" and nginx of the requirement included in base_http_server satisfies "nginx>=2.0" means that the nginx portion of base_http_server is installed. If nginx of base_http_server satisfies "nginx==1.7", this condition is not suitable, and failure to satisfy the version condition occurs, thus making it impossible to use version 1.0 of the base_http_server.

Figure 5:
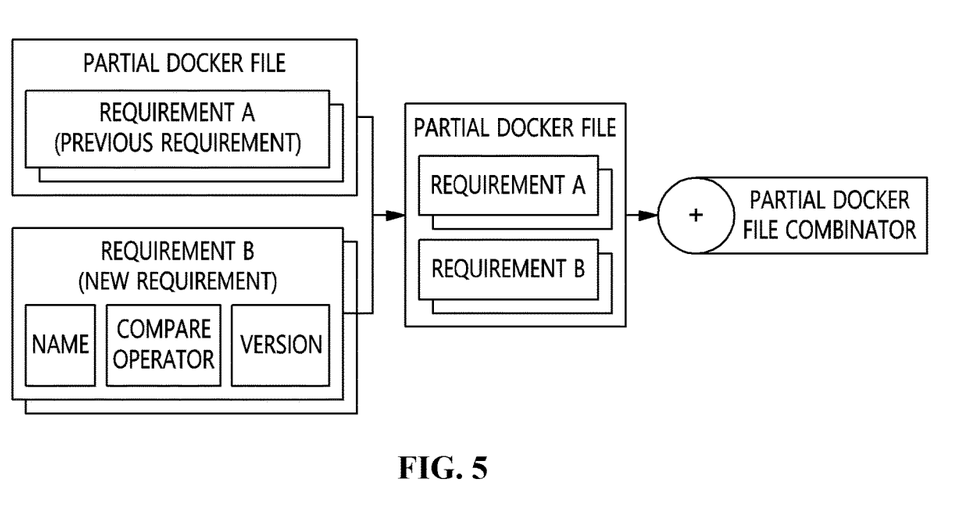
FIG. 5 is a diagram illustrating a process of processing mutual dependency between a partial Docker file and a requirement list according to an embodiment of the present invention.

FIG. 5 is a diagram illustrating a process of processing mutual dependencies between requirement package lists included in a partial Docker file combination set according to an embodiment of the present invention.

Referring to FIG. 5, the process of generating sets for determining mutual dependencies between requirement package lists included in the partial Docker file combination set based on a comparison is illustrated.

It can be seen that the process of determining mutual dependencies between a previous requirement package (requirement) list included in a partial Docker file combination set and a new requirement package (new requirement) list included in a partial Docker file currently being created based on a comparison is illustrated.

Here, comparison operators for the requirements may be defined as follows:
==: must be equal to
=>: must be equal to or greater than
<=: must be less than or equal to
<: must be less than
>: must be greater than Processing of dependencies based on a comparison between the partial Docker files may be performed by obtaining an intersection between the requirement packages of the previous partial Docker file to be added (i.e., previous requirements) and the requirement packages of the partial Docker file to be newly added (i.e., new requirements), comparing overlapping portions thereof with each other, and adding or deleting the overlapping portions depending on the result of the comparison. However, all of the previous requirements and the new requirements except for the intersection, that is, non-overlapping portions obtained as a result of the comparison, may be included.

For example, when the comparison operator of the new overlapping requirement package (new requirement) corresponding to name A is "==", all previous requirements corresponding to name A may be deleted from the previous overlapping requirements to be added, and only the new requirements corresponding to name A may be added.

In addition, when the comparison operator of the new overlapping requirement package (new requirement) corresponding to name A is ">= or <= or < or >", only the requirement having the highest version, among previous requirements and new requirements corresponding to name A and satisfy the comparison operator, may be added, and the remaining requirements may be deleted.

Figure 6:
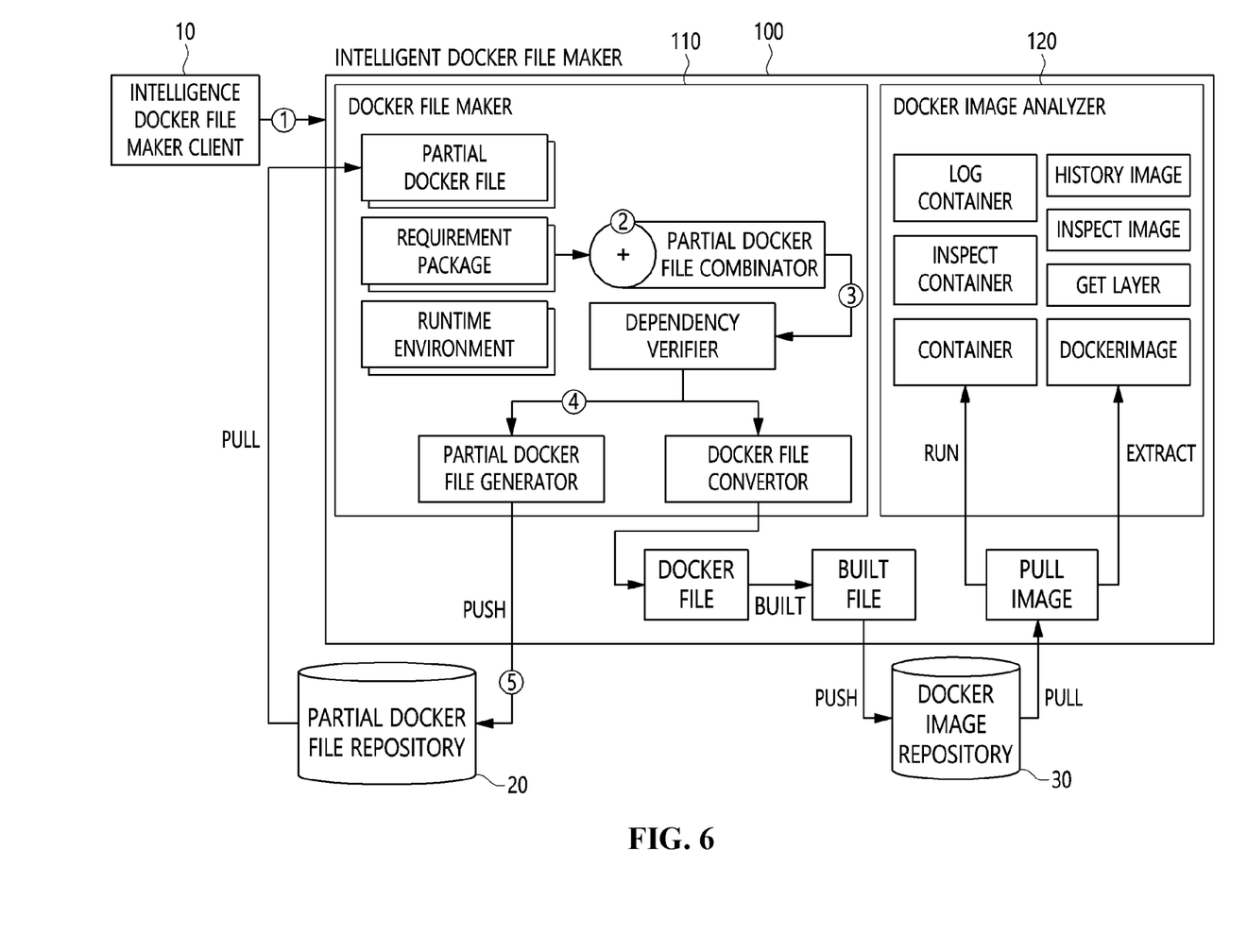
FIG. 6 is a diagram illustrating a partial Docker file generation process according to an embodiment of the present invention.

FIG. 6 is a diagram illustrating a partial Docker file generation process according to an embodiment of the present invention.

Referring to FIG. 6, a Docker image creation apparatus according to the embodiment of the present invention may correspond to an intelligent Docker file maker 100.

Here, the intelligent Docker file maker 100 according to the embodiment of the present invention may include a Docker file maker 110 and a Docker image analyzer 120.

The Docker file maker 110 may include a partial Docker file combinator, a dependency verifier, a partial Docker file generator, and a Docker file convertor.

In the partial Docker file generation process according to an embodiment of the present invention, an intelligent Docker file maker client 10 may transmit commands to the intelligent Docker file maker 100 through a client program (①).

Here, the partial Docker file combinator may combine a partial Docker file, a requirement package list, and a runtime environment (Env) list with each other (②).

Here, the dependency verifier may verify the combined partial Docker file (③).

The partial Docker file generator may generate a partial Docker file based on the combined partial Docker file which has been verified (④).

Here, the partial Docker file generator may store the generated partial Docker file in a partial Docker file repository 20 by executing a push command (⑤).

Figure 7:
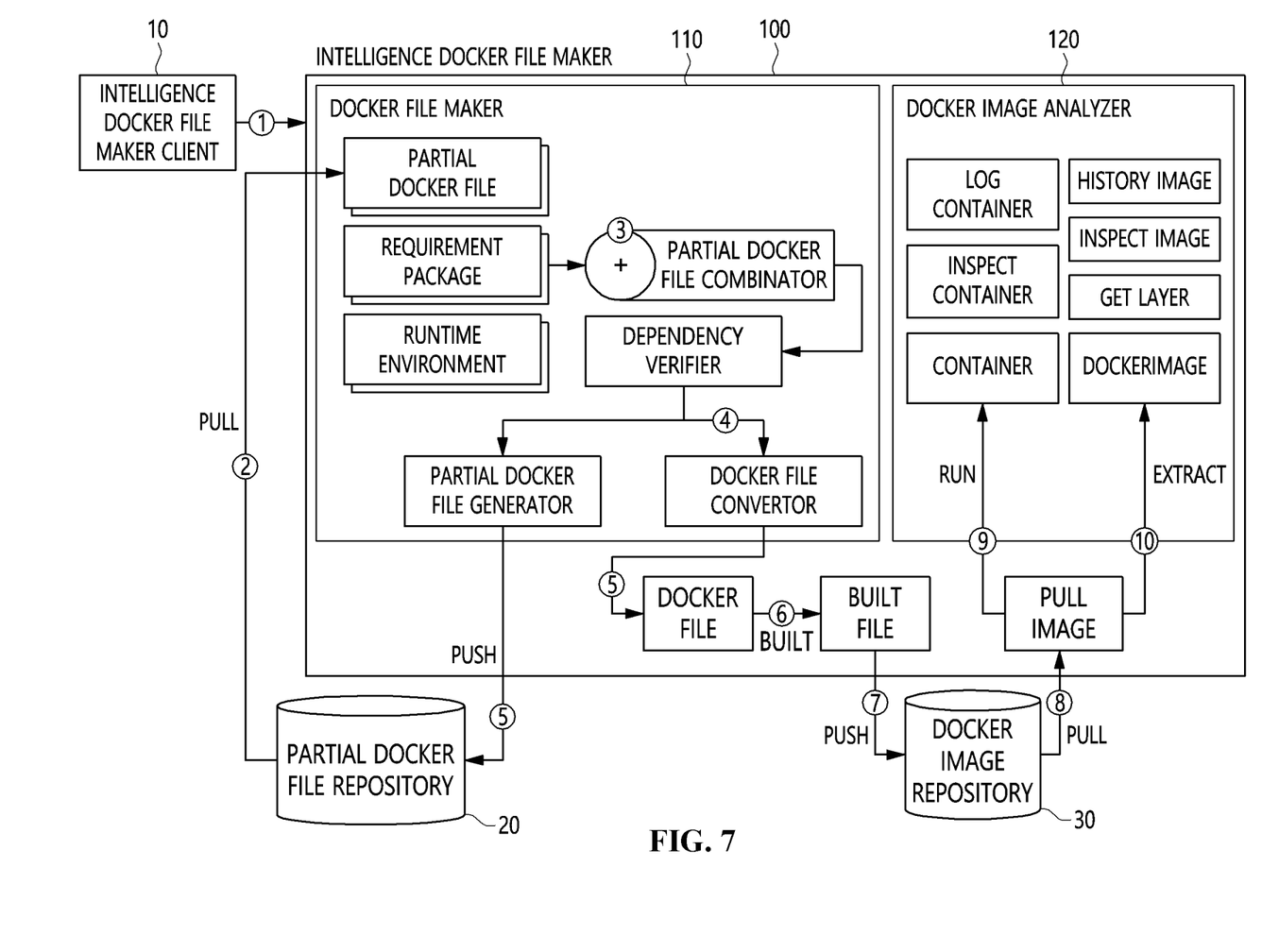
FIG. 7 is a diagram illustrating a Docker image creation process using a partial Docker file according to an embodiment of the present invention.

FIG. 7 is a diagram illustrating a Docker image creation process using a partial Docker file according to an embodiment of the present invention.

Referring to FIG. 7, in the Docker image creation process using a partial Docker file according to the embodiment of the present invention, an intelligent Docker file maker client 10 may transmit commands to an intelligent Docker file maker 100 through a client program (①).

Here, the intelligent Docker file maker 100 may select the partial Docker file to be combined by executing a pull command (②).

Here, a partial Docker file combinator may combine the selected partial Docker file, a requirement package list, and a runtime environment (Env) list with each other (③).

Here, a dependency verifier may verify the combined partial Docker file (④).

Here, a Docker file converter may create a Docker file from the partial Docker file that has been verified (⑤).

Here, the intelligent Docker file maker 100 may create (build) a Docker image from the created Docker file by executing a build command (⑥).

In this case, the intelligent Docker file maker 100 may store the Docker image created from the Docker file in a Docker image repository 30 by executing a push command (⑦).

A Docker image analyzer 120 may load a stored Docker image from the Docker image repository 30 by executing a pull command (⑧).

Here, the Docker image analyzer 120 may run the loaded Docker image in a container by executing a run command, may analyze whether the Docker image is operated, and may record a log of the results of analysis (⑨).

In this case, the Docker image analyzer 120 may divide the Docker image, loaded from the Docker image repository 30, into respective layers by executing an extract command, and may store pieces of detailed information for respective layers (⑩).

Figure 8:
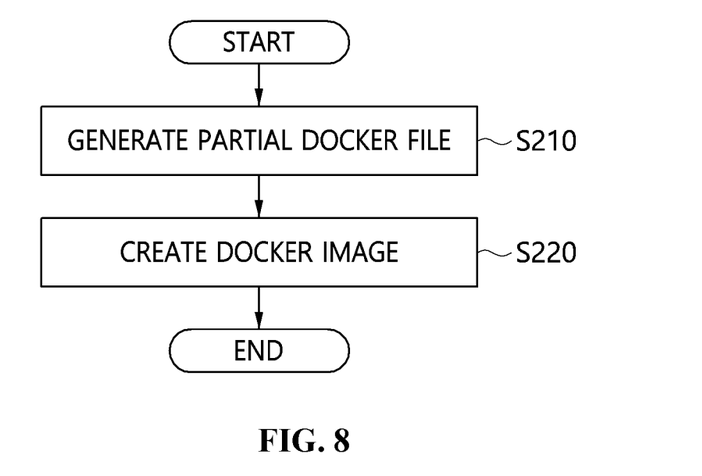
FIG. 8 is an operation flowchart illustrating a Docker image creation method according to an embodiment of the present invention.
Figure 9:
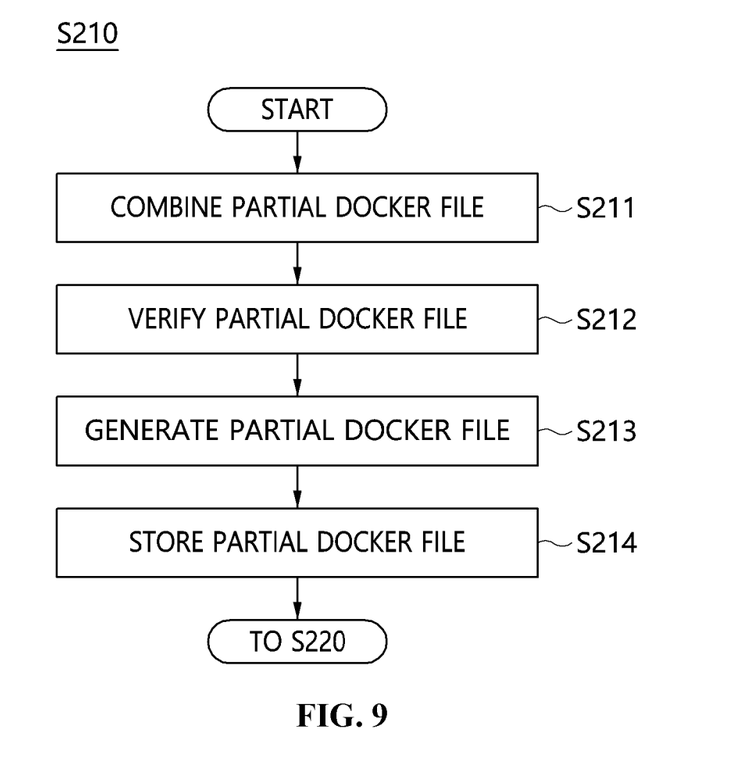
FIG. 9 is an operation flowchart illustrating in detail an example of the partial Docker file generation step illustrated in FIG. 8.
Figure 10:
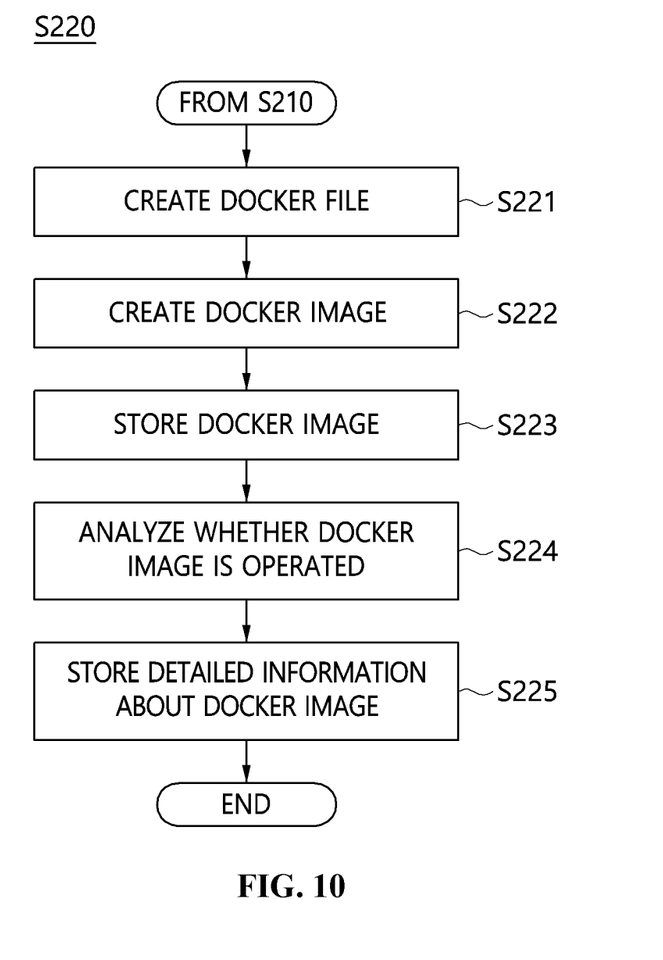
FIG. 10 is an operation flowchart illustrating in detail an example of the Docker image creation step illustrated in FIG. 8.

FIG. 8 is an operation flowchart illustrating a Docker image creation method according to an embodiment of the present invention. FIG. 9 is an operation flowchart illustrating in detail an example of the partial Docker file generation step illustrated in FIG. 8. FIG. 10 is an operation flowchart illustrating in detail an example of the Docker image creation step illustrated in FIG. 8.

Referring to FIG. 8, the Docker image creation method according to the embodiment of the present invention may first generate a partial Docker file at step S210.

That is, at step S210, the partial Docker file may be generated by combining a predefined requirement package list, a runtime environment list, and an initial partial Docker file with each other and by processing mutual dependencies between the requirement packages included in the requirement package list.

Referring to FIG. 9, in a procedure at step S210, a partial Docker file may be combined at step S211.

At step S211, the commands transmitted from the intelligent Docker file maker client 10 through a client program may be received.

At step S211, the partial Docker file to be combined may be selected by executing a pull command.

Here, at step S211, the selected partial Docker file, a requirement package list, and a runtime environment (Env) list may be combined with each other.

Further, in the procedure at step S210, the partial Docker file may be verified at step S212.

That is, at step S212, the combined partial Docker file may be verified.

Also, in the procedure at step S210, a partial Docker file may be generated at step S213.

In detail, at step S213, the partial Docker file may be generated through the partial Docker file that has been verified.

Further, in the procedure at step S210, the partial Docker file may be stored at step S214.

That is, at step S214, the generated partial Docker file may be stored in the partial Docker file repository 20 by executing a push command.

Furthermore, the Docker image creation method according to the embodiment of the present invention may create a Docker image at step S220.

That is, at step S220, the Docker image may be created using the generated partial Docker file.

Referring to FIG. 10, in the procedure at step S220, a Docker file may be created at step S221.

That is, at step S221, the combined partial Docker file may be verified, and the Docker file may be created from the partial Docker file that has been verified.

Also, in the procedure at step S220, a Docker image may be created (built) at step S222.

That is, at step S222, the Docker image may be created from the created Docker file by executing a build command.

Further, in the procedure at step S220, the Docker image may be stored at step S223.

In detail, at step S223, the Docker image created from the Docker file may be stored in the Docker image repository 30 by executing a push command.

Next, in the procedure at step S220, whether the Docker image is operated may be analyzed at step S224.

At step S224, the Docker image analyzer 120 may load the stored Docker image from the Docker image repository 30 by executing a pull command.

Here, at step S224, whether the Docker image is operated may be analyzed by running the loaded Docker image in a container based on a run command, and a log of the results of analysis may be recorded.

Also, in the procedure at step S220, detailed information about the Docker image may be stored at step S225.

That is, at step S225, the Docker image loaded from the Docker image repository 30 may be divided into respective layers by executing an extract command, and pieces of detailed information for respective layers may be stored.

Figure 11:
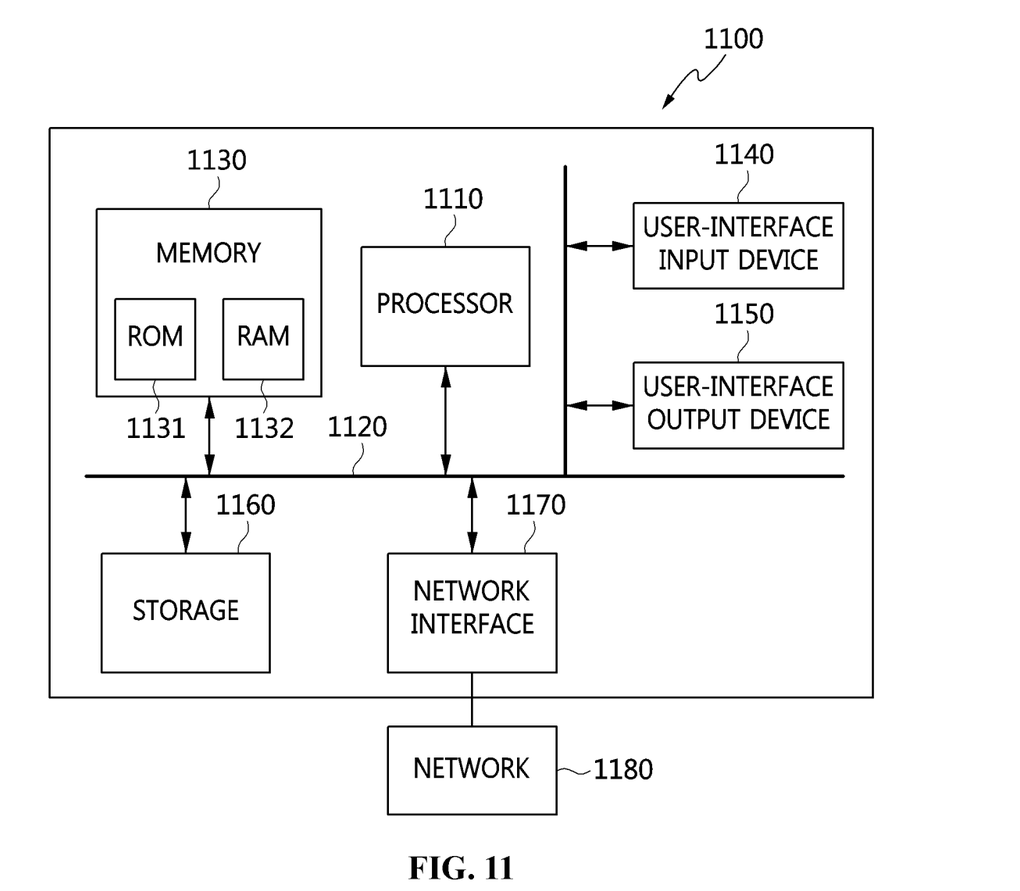
FIG. 11 is a diagram illustrating a computer system according to an embodiment of the present invention.

FIG. 11 is a diagram illustrating a computer system according to an embodiment of the present invention.

Referring to FIG. 11, a Docker image creation apparatus according to an embodiment of the present invention may be implemented in a computer system 1100, such as a computer-readable storage medium. As illustrated in FIG. 11, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The Docker image creation apparatus according to the embodiment of the present invention may include one or more processors 1110, and execution memory 1130 for storing at least one program that is executed by the one or more processors, wherein the at least one program is configured to create a Docker image based on a previous Docker file, and execute a push command to store the created the Docker file to a registry, wherein the Docker file is created from a partial Docker file of the previous Docker file, wherein the Docker image is created from a verified partial Docker file, after the partial Docker file is verified.

Here, the at least one program may be configured to combine a predefined requirement package list, a runtime environment list, and an initial partial Docker file and then generate the partial Docker file; and delete overlapping requirement packages by comparing requirement packages included in the requirement package list with each other so as to process the mutual dependency.

The at least one program may be configured to delete overlapping requirement packages by comparing the requirement packages in the requirement package list with requirement packages in a new requirement package list with each other so as to process the mutual dependency.

The at least one program may be configured to analyze whether the Docker image is operated by running the Docker image in a container.

The at least one program may be configured to divide the Docker image into respective layers and store pieces of detailed information for respective layers.

The present invention may enable an application to be executed through a single task without requiring a separate additional task even if movement to a different computing environment occurs through a container service.

Further, the present invention may reduce management costs incurred during the process of operating and managing a container platform.

As described above, in the Docker image creation apparatus and method according to the present invention, the configurations and schemes in the above-described embodiments are not limitedly applied, and some or all of the above embodiments can be selectively combined and configured such that various modifications are possible.

What is claimed is:

1. A Docker image creation apparatus comprising:
one or more processors; and
an execution memory for storing at least one program that is executed by the one or more processors,
wherein the at least one program is configured to:
create a Docker image based on a previous Docker file, and
execute a push command to store the created Docker image to a registry,
wherein a Docker file is created from a partial Docker file of the previous Docker file,
wherein the Docker image is created from a verified partial Docker file, after the partial Docker file is verified,
wherein the at least one program is configured to combine a predefined requirement package list,
a runtime environment list, and an initial partial Docker file and then generate the partial Docker file; and
delete overlapping requirement packages by comparing requirement packages included in the predefined requirement package list with each other so as to process a mutual dependency.

2. The Docker image creation apparatus of claim 1, wherein the at least one program is configured to delete overlapping requirement packages by comparing the requirement packages in the predefined requirement package list with requirement packages in a new requirement package list with each other so as to process the mutual dependency.

3. The Docker image creation apparatus of claim 1, wherein the at least one program is configured to analyze whether the Docker image is operated by running the Docker image in a container.

4. The Docker image creation apparatus of claim 3, wherein the at least one program is configured to divide the Docker image into respective layers and store pieces of detailed information for respective layers.

5. A Docker image creation method performed by a Docker image creation apparatus, the Docker image creation method comprising:
creating, by one or more processors, a Docker image based on a previous Docker file; and
executing, by the one or more processors, a push command to store the created Docker image to a registry,
wherein a Docker file is created from a partial Docker file of the previous Docker file,
wherein the Docker image is created from a verified partial Docker file, after the partial Docker file is verified,
wherein creating, by the one or more processors, the Docker image comprises: combining a predefined requirement package list, a runtime environment list, and an initial partial Docker file and then generate the partial Docker file; and
deleting overlapping requirement packages by comparing requirement packages included in the predefined requirement package list with each other so as to process a mutual dependency.

6. The Docker image creation method of claim 5, wherein creating, by the one or more processors, the Docker image generating the partial Docker file further comprises:
   deleting overlapping requirement packages by the comparing requirement packages in the predefined requirement package list with requirement packages in a new requirement package list with each other so as to process the mutual dependency.

7. The Docker image creation method of claim 5, wherein creating, by the one or more processors, the Docker image further comprises:
   analyzing whether the Docker image is operated by running the Docker image in a container.

8. The Docker image creation method of claim 7, wherein creating by the one or more processors, the Docker image further comprises:
   dividing the Docker image into respective layers and storing pieces of detailed information for respective layers.

* * * * *